United States Patent
Satin et al.

(10) Patent No.: US 11,504,799 B2
(45) Date of Patent: Nov. 22, 2022

(54) HEAT-EXCHANGER ELEMENT AND METHOD FOR PRODUCING A HEAT-EXCHANGER ELEMENT

(71) Applicant: Kelvion Holding GmbH, Bochum (DE)

(72) Inventors: Mehmet Satin, Marl (DE); Lv Yongzhi, Shanghai (CN); Shen Kang, Jiangsu (CN)

(73) Assignee: KELVION HOLDING GMBH, Bochum (DE)

(*) Notice: Subject to any disclaimer, the term of this patent is extended or adjusted under 35 U.S.C. 154(b) by 18 days.

(21) Appl. No.: 16/652,923

(22) PCT Filed: Oct. 12, 2018

(86) PCT No.: PCT/DE2018/100841
§ 371 (c)(1),
(2) Date: Apr. 1, 2020

(87) PCT Pub. No.: WO2019/080962
PCT Pub. Date: May 2, 2019

(65) Prior Publication Data
US 2020/0232723 A1    Jul. 23, 2020

(30) Foreign Application Priority Data
Oct. 24, 2017    (DE) .................. 10 2017 124 808.0

(51) Int. Cl.
*B23K 15/00* (2006.01)
*B23K 9/02* (2006.01)
(Continued)

(52) U.S. Cl.
CPC ........ *B23K 15/0053* (2013.01); *B23K 9/0026* (2013.01); *B23K 9/02* (2013.01);
(Continued)

(58) Field of Classification Search
CPC .... B23K 9/0026; B23K 9/02; B23K 15/0006; B23K 15/0046; B23K 15/0053;
(Continued)

(56) References Cited

U.S. PATENT DOCUMENTS 1,657,028 A * 1/1928 Nelson .................. F28D 7/1646
165/83
3,003,601 A * 10/1961 Ott ....................... B23K 33/004
403/270
(Continued)

FOREIGN PATENT DOCUMENTS

| AT | 500 655 | 2/2006 |
|----|---------|--------|
| CN | 104785958 A | 7/2015 |

(Continued)

OTHER PUBLICATIONS

International Search Report issued by the European Patent Office in International Application PCT/DE2018/100841 dated Jan. 17, 2019.
(Continued)

*Primary Examiner* — Eric S Ruppert
*Assistant Examiner* — Hans R Weiland
(74) *Attorney, Agent, or Firm* — Henry M. Feiereisen LLC

(57) ABSTRACT

The invention relates to a heat-exchanger element for connection to tubes of a heat exchanger, the heat-exchanger element (1, 29, 32) consisting of a plurality of components (13, 14) welded to each other, and said components (13, 14) being interconnected by electron beam welding and being part of a heat exchanger head.

12 Claims, 3 Drawing Sheets

(51) Int. Cl.
*B23K 33/00* (2006.01)
*B23K 9/00* (2006.01)
*B23K 101/14* (2006.01)

(52) U.S. Cl.
CPC .......... *B23K 15/0046* (2013.01); *B23K 33/00* (2013.01); *B23K 2101/14* (2018.08); *F28F 2275/06* (2013.01); *F28F 2275/064* (2013.01)

(58) Field of Classification Search
CPC ... B23K 33/00; B23K 2101/14; F28F 9/0219; F28F 9/26; F28F 2275/06; F28F 2275/064
See application file for complete search history.

(56) References Cited

U.S. PATENT DOCUMENTS

| | | | | |
|---|---|---|---|---|
| 3,430,323 | A * | 3/1969 | Brown | B23K 20/08 |
| | | | | 29/890.038 |
| 5,881,681 | A * | 3/1999 | Stuart | F24H 1/287 |
| | | | | 122/18.31 |
| 5,952,109 | A * | 9/1999 | Nagami | B23K 33/00 |
| | | | | 428/599 |
| 6,772,932 | B1 | 8/2004 | Halstead | |
| 2001/0007331 | A1* | 7/2001 | Iwago | B23K 9/02 |
| | | | | 228/163 |
| 2006/0108342 | A1 | 5/2006 | Samodell et al. | |
| 2007/0119830 | A1* | 5/2007 | Meier | B23K 15/0053 |
| | | | | 219/121.64 |
| 2007/0235433 | A1 | 10/2007 | Osicki | |
| 2009/0120920 | A1 | 5/2009 | Gurney et al. | |
| 2009/0255068 | A1* | 10/2009 | Inose | B23K 9/0026 |
| | | | | 14/75 |
| 2009/0280349 | A1 | 11/2009 | Bittendorfer et al. | |
| 2011/0198317 | A1* | 8/2011 | Lin | B23K 15/006 |
| | | | | 219/73 |
| 2015/0176758 | A1 | 6/2015 | Nicholson et al. | |
| 2016/0322742 | A1 | 11/2016 | Mayer-Rose et al. | |

FOREIGN PATENT DOCUMENTS

| | | |
|---|---|---|
| CN | 205852089 U | 1/2017 |
| DE | 25 26 480 | 1/1976 |
| DE | 3532305 A1 | 3/1987 |
| DE | 102 58 903 | 8/2004 |
| DE | 102005005214 | 8/2006 |
| EP | 1598157 A1 | 11/2005 |
| JP | 57-24890 | 2/1982 |
| RU | 2207235 C1 | 6/2003 |
| RU | 2285599 C1 | 10/2006 |
| RU | 2510316 C1 | 3/2014 |
| RU | 2627553 C1 | 8/2017 |

OTHER PUBLICATIONS

J. Ruge: "Handbuch der Schweisstechnik, vol. IV", Springer-Verlag, 1988.
Chinese Search Report dated Jul. 7, 2020 with respect to counterpart Chinese patent application 2018100623509.
Translation of Chinese Search Report dated Jul. 7, 2020 with respect to counterpart Chinese patent application 2018100623509.
Russian Search Report dated Jun. 29, 2020 with respect to counterpart Russian patent application 2020114504/05(024144).
Translation of Russian Search Report dated Jun. 29, 2020 with respect to counterpart Russian patent application 2020114504/05(024144).

* cited by examiner

HEAT-EXCHANGER ELEMENT AND METHOD FOR PRODUCING A HEAT-EXCHANGER ELEMENT

CROSS-REFERENCES TO RELATED APPLICATIONS

This application is the U.S. National Stage of International Application No. PCT/DE2018/100841, filed Oct. 12, 2018, which designated the United States and has been published as International Publication No. WO 2019/080962 A1 and which claims the priority of German Patent Application, Serial No. 10 2017 124 808.0, filed Oct. 24, 2017, pursuant to 35 U.S.C. 119(a)-(d).

BACKGROUND OF THE INVENTION

The invention relates to a heat exchanger element for connecting to tubes of a heat exchanger.

Heat exchangers for exchanging thermal energy between flowable media, in particular between liquids and gases, have, for media separation, ducts, in particular in the form of tubes, through which a heat exchange medium flows. The tubes are connected to what is known as a tube sheet, which is a constituent part of a heat exchanger head. Heat exchanger heads and the tubes of heat exchangers usually consist of metal on account of its high thermal conductivity. Accordingly, the heat exchanger heads are often in the form of welded structures. The welding of media-carrying components places high demands on the welding method, since fluid-tightness, even under sometimes high pressures and under high thermal cycling, must not result in fatigue phenomena during operation. For this reason, sometimes complicated weld preparations have to be carried out for fillet welds and butt welds. Particular welding methods, such as submerged arc welding, plasma arc welding, TIG welding or electrode welding are used in order to ensure a high welding quality.

An example is intended to illustrate how much work is required to weld thick-walled components (>10 mm) for heat exchangers: in the case of components of greater thickness that are to be connected using submerged arc welding, after the two-sided seam preparation for a double V-seam, first submerged arc welding is carried out from one side (root side) as a counter weld/cap. The counter weld is necessary because it is not permissible to use components in heat exchangers in which very high pressures prevail, which are not fully welded at their connection points or have notches. The counter weld is located on the inside of the heat exchanger. The seam preparation on the outside must reach so deep that only a narrow contact surface remains between the components, which is completely melted during welding.

For materials that are difficult to process, especially from the group of highly corrosion-resistant nickel-molybdenum alloys, relatively large, i.e. wide seam preparations are made. In any case, it must be avoided that microcracks occur in the structure during welding, which can be identified by subsequent X-rays or ultrasound of the welded connection. The relatively large seam preparations mean that, depending on the thickness of the workpiece, 10 or more welding layers have to be applied in succession. The first welding layers are usually made by hand. In this way, the heat input can be better controlled and specifically kept low. The other layers can then be machined. With a component thickness of 20 mm, for example, 9 layers can already be produced on one outer side plus the counter weld on the inner side. With a component thickness of 30 mm, 15 layers are required on the outside for a professional welding and with a component thickness of 35 mm, even 20 welding layers. For components over 100 mm thick, the manufacturing effort is immense. The processing times are very long. The cost of the welding consumables is considerable.

The prior art also includes electron beam welding processes, which are described, for example, for the production of multi-part assemblies in AT 500 655 A1. DE 102 58 503 A1 describes a tunnel tube sheet for prior art heat exchangers, in which sheet steel plates of the tube sheet are welded to webs of a supporting sheet by means of laser beam welding or electron beam welding. This is intended to achieve higher quality in execution and thus in the technical parameters of the heat exchanger, and to reduce manufacturing costs. The components are prepared in such a way that in the case of a butt connection on a first component, a shoulder is made on which the second component is placed. An L-shaped cross-section is created, into which the electron beam is directed, so that the electron beam is directed directly at the shoulder that is melted by the electron beam. In the case of thin-walled components, the shorter leg of the joint can also be melted completely. In the case of thick-walled components, the tolerance fields may be larger. In addition, the shoulder as a support is then wider and in particular significantly wider than an electron beam. In this case, the electron beam cannot completely weld the L-shaped joint. The longer the shoulder, the more problematic is the requirement to completely melt the weld joint.

The invention is based on the object of demonstrating a heat exchanger element for connecting to tubes of a heat exchanger, which can be produced more cost-effectively, is of particularly high welding quality and ensures high operational reliability. A method for producing such a heat exchanger head is also to be demonstrated.

SUMMARY OF THE INVENTION

According to one aspect of the invention, the object is achieved by a heat exchanger element which includes a plurality of welded-together components, which are connected together by means of electron beam welding. Said components are constituent parts of a heat exchanger head.

The dependent claims relate to advantageous developments of the invention.

The heat exchanger element according to the invention belongs to the heat exchanger head or forms the heat exchanger head. The components are connected together by means of electron beam welding. Electron beam welding has the extraordinary advantage, in particular in the case of components of a heat exchanger head, that the comparatively complicated submerged arc welding can be completely or largely replaced. The heat exchanger element according to the invention does not imply that electron beam welding is the only welding method with which it is produced. It can be combined with further welding methods, in particular with a submerged arc welding method, TIG welding method, plasma arc welding method or electrode welding method, but is intended to replace these as far as possible. The weld seam produced by electron beam welding is supported by root counter welding, wherein the root counter welding is produced before the electron beam welding.

The heat exchanger element according to the invention comprises two components, which are connected at a corner joint via a weld produced by electron beam welding. The weld is preferably in the form of an I weld.

In the case of such I welds—in contrast to fillet welds—less material has to be removed. No or at least fewer weld filler metals are required. In addition, no powders (for the submerged arc welding method) are required. At the same time, a weld of very high quality can be produced with electron beam welding with sufficiently precise weld preparation, this ultimately causing fewer repairs and less reworking.

In the case of the I weld—in contrast to the conventional (V) weld preparation of 45°+/−25°—the conventional weld preparations are dispensed with. This is an important difference in the case of complex components and is a considerable advantage over the conventional welding method, such as submerged arc welding or TIG and electrode welding.

In the region of the seam root, I.e. In the fillet between the two welded components, a support weld is additionally performed as a root counter weld, in particular by submerged arc welding. Accordingly, the fillet can be filled with a root weld in one or a plurality of layers. The fillet is worked out as a deepening/phase in the two components to be connected. This has the advantage that the deepest point of the fillet is very close to the support, so that the support is melted completely and so that the melt extends into the upper/other leg of the L-shaped butt joint. This creates the basis for electron beam welding. In the invention, the electron beam partially melts the root weld but not the support. The electron beam is only oriented in the direction of the original support, where the root counter weld is located due to the production sequence. Longer supports are possible with the invention. This allows larger tolerance ranges to be selected. Nevertheless, precise, fast and high-quality welding production is possible.

In a further exemplary embodiment, an outer edge of the heat exchanger element is formed on one of the two welded-together components, said outer edge extending at a parallel spacing from the weld. Preferably, two components are connected at a corner joint via a weld produced by electron beam welding, said weld being in the form of a vertical I weld. Vertical means in this connection that the welding joint faces of the components are arranged in a perpendicular manner during welding. On the component to which the weld extends parallel, a shoulder that is set back with respect to the inner side of the first component is formed as a support for the second component, such that a weld root of the vertical weld extends at a spacing from an inner side of the first component in this type of welding, a high-power electron beam can be introduced, since the energy is introduced into the component via the end side of the component.

Also, in the case of what is known as the vertical weld, the weld root is supported by an additionally produced counter weld on the shoulder, at which the electron beam is directed during welding. The weld root is not located at any desired depth in the first component, but rather at the point at which the welding joint faces end at the shoulder. Electron beams that pass more deeply would not have any advantage with regard to the durability of the weld. However, it is important that said components are connected together in a reliable manner in the region of the root counter weld, i.e. also at the shoulder, which extends transversely to the electron beam. To this end, the root counter weld can be in the form of a V weld, which extends right up to the shoulder, resulting in full-surface welding.

The root counter weld can be realised in one or a plurality of layers by submerged arc welding, plasma arc welding, TIG welding or MAG welding.

Preferably, at least one component is a wall or a tube sheet of the heat exchanger head, wherein this component is connected to a further component formed as a wall, as an inner support, as a partition plate or as a connection piece for the heat exchanger head. Depending on compressive loading, head exchanger heads can be provided with inner supports and/or partition walls, which are connected to the outer walls or tube sheets, in order to transmit tensile or compressive forces. Tensile forces are transmitted when there is a positive pressure within the heat exchanger head. However, applications also exist in which the heat exchangers are operated with negative pressure. In this case, the inner supports serve to counter positive pressure from the outside.

In a further embodiment of the invention, the first component is cylindrical and the second component is a cover for the first component. Heat exchanger heads do not have to be formed in a cuboidal or semi-circular manner. There are in particular also cylindrical cross-sections of heat exchanger heads. Cylindrical heat exchanger heads are connected to tubes in that the tubes are joined to the heat exchanger heads from the outside. For manufacturing reasons, cylindrical heat exchanger heads need to be closed at least at one end via a cover. The weld between the cover and the cylindrical body of the heat exchanger head is produced according to the invention by electron beam welding.

The heat exchanger element according to the invention preferably has components that have a thickness in a range from 10 to 200 mm, preferably 10 to 120 mm. In the case of materials with these thicknesses, heat exchange processes can be run under high or very low pressures. The welding of the components with such large wall thicknesses can be very complicated and time-consuming using the conventional method of submerged arc welding, TIG welding, electrode welding, plasma arc welding or MAG welding. Specifically, in the case of the very large wall thicknesses of more than 30 mm, electron beam welding can considerably simplify the welding method. In particular, consideration should be given to the fact that heat exchangers for industrial installations have lengths of up to 6000 mm.

The specific application and the customer requirements usually determine the compressive strengths that are intended or need to be achieved and which media need to be passed through the heat exchangers. This results in a suitable selection of metal materials. The components to be welded are preferably made of one of the following materials:

SA-516 Gr60, P265GH, SA-516 Gr70, SA-537 Cl1, SA-350 LF2 CL1, SA-333 Gr6, P355NH, SA-335P22, SA-387 Gr11Cl2, SA-387 Gr12Cl1, SA-387 Gr11Cl1, SA-240 Gr304L, SA-240 Gr304, SA-240 Gr316L, X6CrNiRi18-10 (321), X2CrNiMo17-12-2(316L).

BRIEF DESCRIPTION OF THE DRAWING

The invention is explained in more detail below with reference to the exemplary embodiments illustrated in the schematic drawings, in which.

DETAILED DESCRIPTION OF PREFERRED EMBODIMENTS

Figure 1:
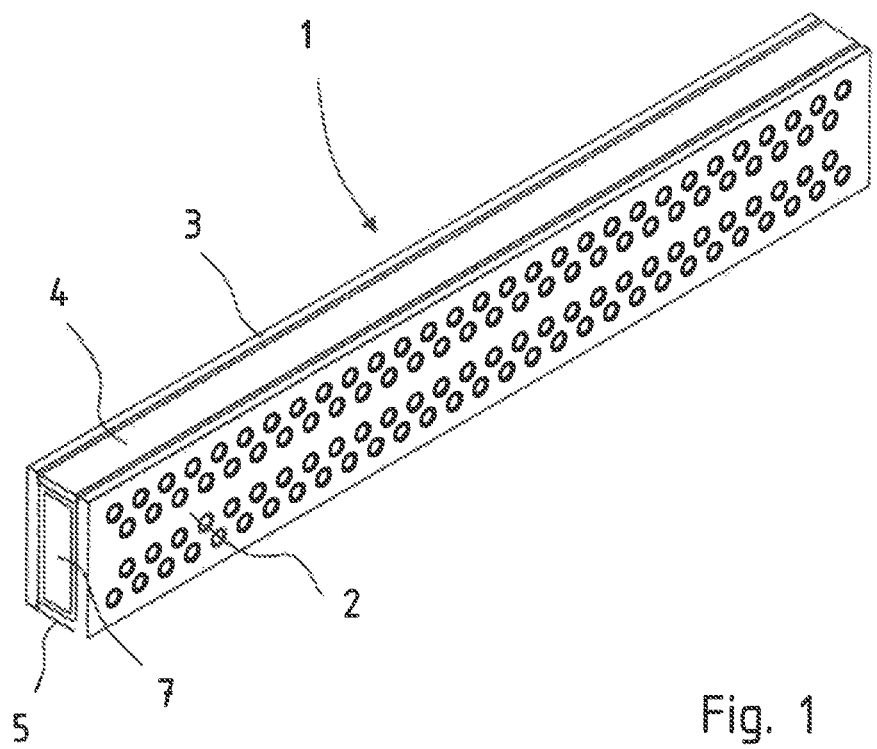
FIG. 1 shows a perspective illustration of a heat exchanger head.

FIG. 1 shows a heat exchanger element 1 in the form of a box-shaped heat exchanger head for delimiting a chamber. The heat exchanger element 1 includes a plurality of welded-together components. A first component 2 is a tube sheet. It serves to receive tubes (not illustrated in more detail) in openings provided therefor in the component 2. Parallel to the tube sheet there extends a further component 3 in the form of a rear threaded sheet. Between the tube sheet and the rear threaded sheet, an upper and a lower chamber plate have been welded as further components 4, 5.

Figure 2:
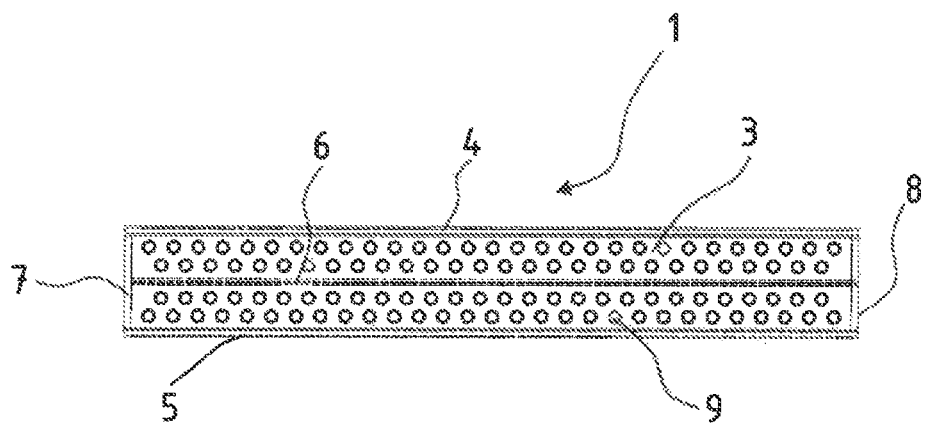
FIG. 2 shows the heat exchanger head from FIG. 1 in longitudinal section.

The longitudinal section in FIG. 2 through the heat exchanger element 1 in FIG. 1 shows that, in the longitudinal direction at a spacing from the upper and lower chamber plate, a component 6 in the form of a partition plate extending from one end of the heat exchanger element 1 to the other is arranged, said partition plate extending parallel to the upper and lower chamber plate and connecting the lower chamber plate to the threaded sheet by welding. The ends of the heat exchanger element 1 are closed by end plates 7, 8, as can be seen in FIGS. 1, 2 and 3.

The threaded sheet also has bores 9 for receiving tubes.

Figures 3, 4:
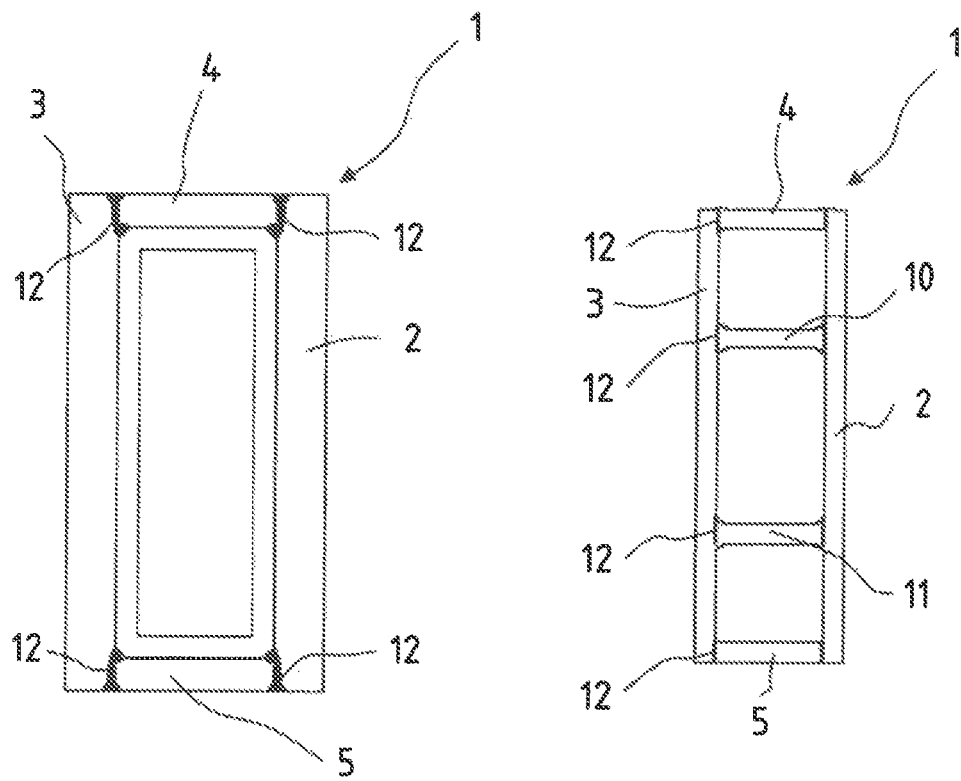
FIG. 3 shows an end-on view of the heat exchanger head from FIG. 1.
FIG. 4 shows a heat exchanger head in cross-section.

FIG. 3 shows a cross-sectional illustration through another heat exchanger element 1, which differs from the preceding embodiment in that two reinforcing components 10, 11 in the form of partition plates extend between the tube sheet and the threaded sheet at a parallel spacing from the upper chamber wall and from the lower chamber wall. The exemplary embodiment in FIG. 4 is intended to illustrate that not only the wall thicknesses can vary compared with the exemplary embodiment in FIG. 1, but also the proportions and the number of individual components 10, 11.

The heat exchanger element 1 according to the invention has components which have been welded together, specifically by electron beam welding. The welded structure has a series of welds, which can extend on the external elements, in particular in the connecting region between the tube sheet and the upper and lower chamber plate. The same applies to the connection between the upper and lower chamber plate and the rear threaded sheet in each case. The welds can also extend in the interior of the heat exchanger element 1, however, as shown in FIG. 4. There, the welds are additionally each located at the ends of the reinforcing components 10, 11 in the form of partition plates at the transition to the tube sheet and a rear threaded sheet, respectively.

FIG. 3 shows one such weld 12 by way of example and as a representative of all other configurations in each corner region.

Figure 5:
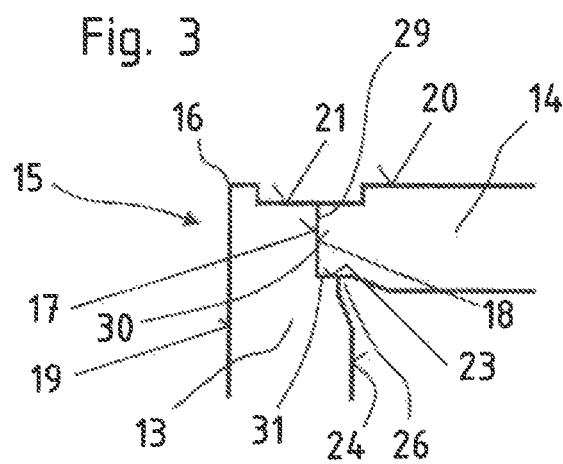
FIG. 5 shows a corner region of components to be welded, prepared for electron beam welding.
Figure 6:
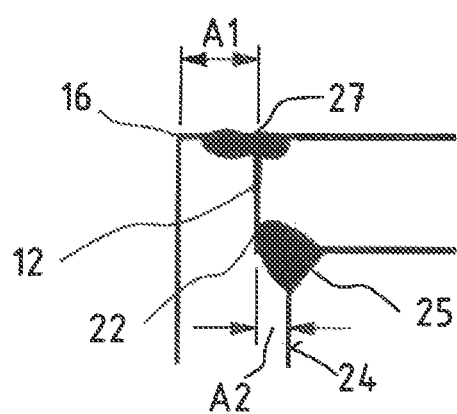
FIG. 6 shows the welded corner region from FIG. 5.

FIG. 5 shows an enlarged illustration of the preparation of the individual components 13, 14 for welding. For the sake of simplicity, the left-hand component in the image plane is referred to as first component 13 in the following text, and the other component, arranged at a 90° angle thereto, is referred to as second component 14. The two components 13, 14 form a corner joint 15, wherein the first component 13 determines an outer edge 16 of the heat exchanger element 1 produced therefrom. The two components 13, 14 are prepared such that, as can be seen in FIG. 6, the weld 12 extends at a parallel spacing A1 from the outer edge 16. The two components 13, 14 are connected together via an I weld 12. The I weld is produced by electron beam welding. The I weld 12 is in the form of a vertical I weld. Welding joint faces 17, 18 of the L-shaped welding joint 29 extend on the one hand parallel to an outer side 19 of the first component 13 in the region of the corner joint 15. Moreover, the welding joint faces 17, 18 extend perpendicularly to the outer side 20 of the second component 14 on account of the 90° arrangement of the components 13, 14. The welding joint 29 therefore has an upper leg 30 and a lower leg 31 on the shoulder 23.

A groove-like recess 21 is located as weld preparation in the upper outer side 20, in the image plane, or the end side of the first component 13. Located in the region of a weld root 22 of the weld 12 produced by electron beam welding (FIG. 6) is a set-back shoulder 23, such that the weld root 22 of the vertical I weld 12 extends at a spacing A2 from an inner side 24 of the first component 13. The first component 13 is parallel with regard to the inner side 24 and the outer side 19 in this cross-sectional plane. It is preferably a plate-like component.

FIG. 6 shows that a root counter weld 25 has been realised in the region of the weld root 22 of the vertical I weld 12 produced by electron beam welding, said root counter weld 25 extending as far as the shoulder 23. FIG. 6 shows that, for the root counter weld 25, a V-shaped fillet 26 has been provided next to the shoulder 23 in the form of a V-shaped recess.

The entry region of the I weld 12 produced by electron beam welding is closed via a cover weld 27, which is arranged in the U-shaped recess 21. Due to the recess 21, the cover weld 27 practically does not protrude beyond the outer side 20. Both the root counter weld 25 and the cover weld 27 can be produced by submerged arc welding. It is also possible to produce the root counter weld 25 and the cover weld 27 by a plasma arc welding method, TIG welding method, electrode welding method or MAG welding method.

In FIG. 4, by way of example, four identical welds are denoted by the reference numeral 12, in order to illustrate that here too, not just the external but also the internal welds can be produced by electron beam welding.

Figure 7:
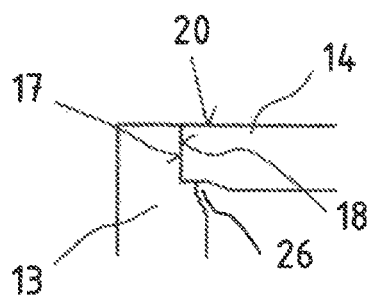
FIG. 7 shows a further corner region, which has been prepared for electron beam welding.
Figure 8:
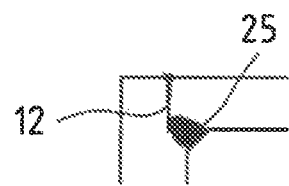
FIG. 8 shows the corner region from FIG. 7, connected by electron beam welding and by submerged arc welding.

FIGS. 7 and 8 show the course of the I weld 12. FIG. 7 shows the weld preparation and FIG. 8 shows the welded state. Reference is made to the reference numerals introduced in FIGS. 5 and 6 where identical components and features are identified.

FIG. 7 differs from the one in FIG. 5 in that a recess 21 in the upper outer side 20 of the second component 14 has been dispensed with. Merely for a root counter weld 25 (FIG. 8), a V-shaped fillet 26 has been worked out at the two components 13, 14. With regard to the production sequence, first of all the V-shaped fillet 26 is filled with a root counter weld 25. In the next production step, the weld 12 is produced as a vertical I weld by electron beam welding, said vertical I weld connecting the welding joint faces 17, 18 extending perpendicularly in the image plane.

The heat exchanger elements according to the invention can have very large wall thicknesses. Wall thicknesses of up to 200 mm are weldable in a single pass. As a result of the electron beam welding, costly filling materials are avoided. The energy input is very low, with the result that the material properties of the components to be welded are preserved because the heat-affected zone is very narrow.

By means of electron beam welding it is also possible to connect together materials that are difficult to weld, for example heat-sensitive materials such as nickel alloys. It is also possible for highly thermally conductive materials such as copper alloys to be welded in this way, since, on account of the lower energy input and the smaller heat-affected zone, only brief heat input occurs. The lower heat input at the same time results in fewer thermally induced stresses, with the result that shrinkage or warping in the workpiece is avoided. A further advantage to be mentioned is that very high feed rates of up to 15 metres per minute are possible.

The use of electron beam welding for heat exchanger elements is automated and takes place under CNC control, thereby ensuring a high level of reproducibility. As a result, welds of very high quality can be created, while, at the same time, the variables of the welding method can be monitored and recorded.

The electron beam welding takes place under vacuum. Therefore, there is no oxidation and no oxide deposition. Ultimately, even titanium materials are weldable as a result of welding under vacuum, thereby making it possible to produce heat exchanger elements with very particular properties, which are not achievable by means of conventional submerged arc welding.

A very particular advantage of the heat exchanger element 1 according to the invention is its property of being able to be welded together from its components in a very short time. This is also due to the fact that, although the weld preparation has to be very accurate, in order to provide exact welding joint faces 17, 18, not so much material has to be removed as in submerged arc welding. In submerged arc welding, V-shaped welds are necessary, which make extensive machining necessary. As a result, the welds are thicker and larger overall. The heat-affected zones are also much wider. All of these drawbacks are avoided in the case of the heat exchanger elements produced according to the invention with the very narrow welds.

In the scope of the invention, heat exchanger elements are produced by welding individual components, in order to be able to connect them to tubes of a heat exchanger after further production steps. Since, after welding, thermal distortion cannot be ruled out in particular when submerged arc welding additionally has to be carried out, the welding is followed by straightening and optionally trimming of ends of the heat exchanger element. Subsequently, the desired openings can be introduced into the heat exchanger housing by machining operations. Tests have shown that when components having a wall thickness of 30 mm over a length of 3000 mm are welded only by submerged arc welding, 17.42 working hours are required. As a result of electron beam welding being combined with the submerged arc welding, as is shown for example in FIG. 8, it was possible to reduce the time requirement to 2.54 hours. If the root counter weld 25 is additionally dispensed with in the exemplary embodiment in FIG. 8, the time requirement is reduced to 1.41 hours. The time requirement is lower by a factor of around 10. In the case of stainless steels, the values of the welding duration compared with the conventional method are in an order of magnitude of 20.91 hours to 1.41 hours or 34.85 hours to 1.41 hours, respectively. In the case of high-alloy steels (wall thickness 14 mm), the values are even 55.79 hours and 1.41 hours, respectively. This represents a time saving by a factor of virtually 40. If submerged arc welding is dispensed with, the costs for welding powder and filler metals are also dispensed with, with the result that, naturally, the production costs of such heat exchanger elements are also reduced simply on account of the reduced material usage.

The invention claimed is:

1. A heat exchanger element, comprising:
a plurality of components which are welded together, with two of the components forming a corner joint, one of the two components formed with a set-back shoulder that is set back with respect to an inner side of the one component to provide a support for another one of the two components to thereby form an L-shaped welding joint, said two components being configured to form a set-back fillet worked out in the two components in adjacent relation to the set-back shoulder to thereby provide a weld preparation for a root counter weld configured as V weld which is located in the set-back fillet to melt a lower leg of the L-shaped welding joint and to connect the two components, said L-shaped welding joint including an upper leg configured to enable from a side opposite to the lower leg direction of an I-shaped weld by electron beam welding towards the root counter weld so as to completely fill up the welding joint from the opposite side, said V weld extending diagonal to the I-shaped weld and extending diagonal to the lower leg of the L-shaped welding joint.

2. The heat exchanger element of claim 1, wherein the upper leg of the L-shaped welding joint has welding joint faces which extend perpendicular to an outer side of the other one of the two components.

3. The heat exchanger element of claim 1, wherein the I-shaped weld has a weld root at a spacing from an inner side of the one of the two components.

4. The heat exchanger element of claim 1, wherein the root counter weld is formed of one or a plurality of layers as a submerged arc welding, plasma arc welding, TIG welding or MAG welding.

5. The heat exchanger element of claim 1, wherein at least one of the two components is configured to form a wall or a tube sheet of a heat exchanger head.

6. The heat exchanger element of claim 5, wherein at least one of the two components is connected to a further one of the components formed as a wall or tube sheet, as a partition plate or as a connection piece for the heat exchanger head.

7. The heat exchanger element of claim 1, wherein the one of the two components is cylindrical and the other one of the two components is a cover for the one of the two components.

8. The heat exchanger element of claim 1, wherein the components each have a thickness of 10 to 200 mm.

9. The heat exchanger element of claim 1, wherein the components are made of an ASTM-designated material selected from the group consisting of SA-516 Gr60, P265GH, SA-516 Gr70, SA-537 Cl1, SA-350 LF2 CL1, SA-333 Gr6, P355NH, SA-335P22, SA-387 Gr11Cl2, SA-387 Gr12Cl1, SA-387 Gr11Cl1, SA-240 Gr304L, SA-240 Gr304, SA-240 Gr316L, X6CrNiRi18-10 (321), X2CrNiMo17-12-2(316L).

10. A method for producing a heat exchanger element, comprising:
forming a set-back shoulder on a first component that is set back with respect to an inner side of the first component as support for a second component prior to subsequent welding;
forming a worked-out set-back fillet in the first and second components in adjacent relationship to the set-back shoulder as a preparation seam for a root counter weld and prior to subsequent welding;
performing a root counter weld in the set-back fillet, thereby melting a lower leg of an L-shaped welding joint between the first and second components and connecting the first and second components to one another, with the root counter weld reaching as far as an upper leg of the L-shaped welding joint; and
directing by electron beam welding an I-shaped weld from a side opposite to the lower leg in the upper leg of the L-shaped welding joint onto the root counter weld to thereby completely fill the L-shaped welding joint.

11. The method of claim 10, further comprising melting a seam protrusion of the I-shaped weld in a further welding process so as to locate the seam protrusion completely in a recess on an outer side without protruding beyond the outer side.

12. The method of claim 10, wherein the root counter weld is formed of one or a plurality of layers as a submerged arc welding, plasma arc welding, TIG welding or MAG welding.

\* \* \* \* \*